M. A. KENDALL.
COAL CRUSHER.
APPLICATION FILED APR. 19, 1920.

1,352,609.

Patented Sept. 14, 1920.
2 SHEETS—SHEET 1.

Inventor
Myron A. Kendall
Gillson & Gillson
Attorneys

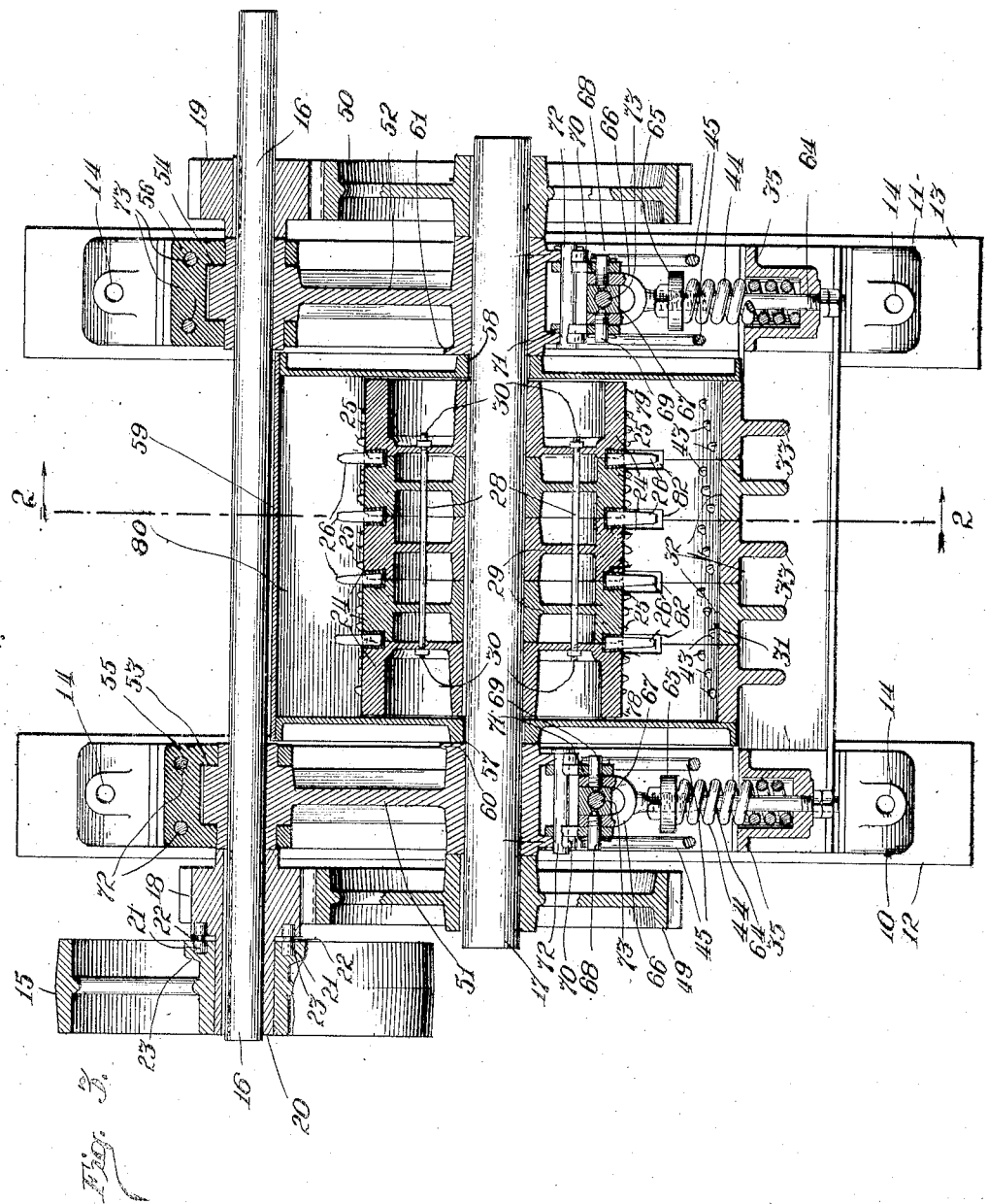

UNITED STATES PATENT OFFICE.

MYRON A. KENDALL, OF AURORA, ILLINOIS, ASSIGNOR TO STEPHENS-ADAMSON MFG. CO., OF AURORA, ILLINOIS, A CORPORATION OF ILLINOIS.

COAL-CRUSHER.

1,352,609.      Specification of Letters Patent.      Patented Sept. 14, 1920.

Application filed April 19, 1920. Serial No. 375,019.

*To all whom it may concern:*

Be it known that I, MYRON A. KENDALL, a citizen of the United States, and resident of Aurora, county of Kane, and State of Illinois, have invented certain new and useful Improvements in Coal-Crushers, of which the following is a specification, and which are illustrated in the accompanying drawings, forming a part thereof.

The invention relates to coal crushers, and has for an object the provision of an apparatus for crushing coal which will automatically pass non-crushable material even if of large size, without harm to the apparatus, and return automatically to operative condition. A further object of the invention is the provision of a device of this class that will pass material so fine as not to need crushing, without the operation of the crushing roll.

An illustrative embodiment of the invention is shown in the accompanying drawings, in which—

Fig. 3 is a horizontal section on line 3—3 of Fig. 1.

Figure 1:
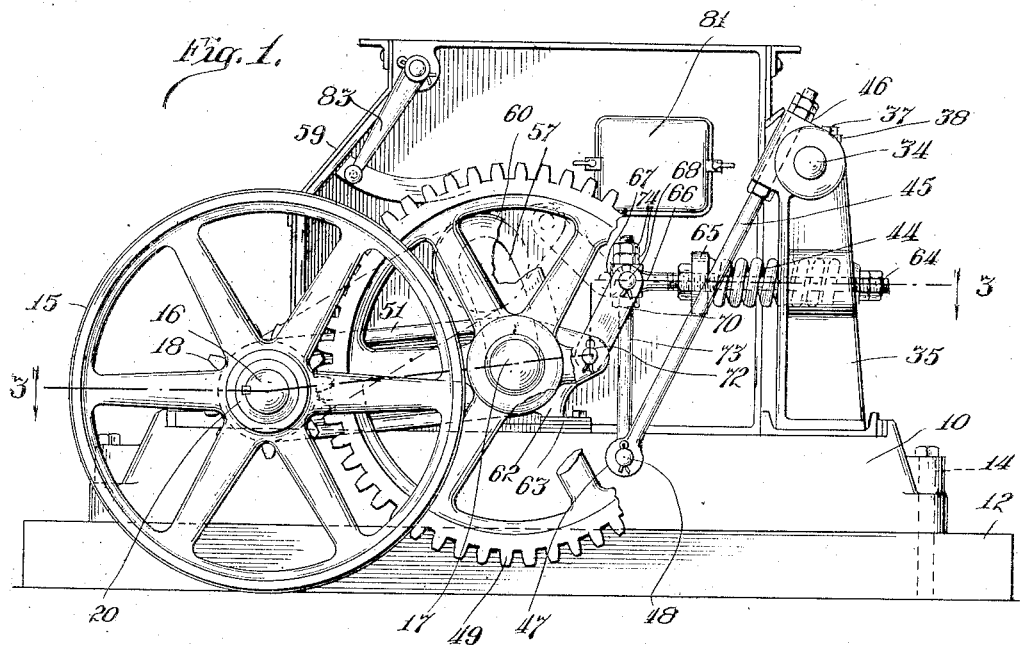
Figure 1 is an end elevation.

As shown, the machine is supported on base members 10, 11, which in turn may be secured to timbers 12, 13, as by bolts passed through bolt-holes 14. For driving the crusher there is shown a pulley 15, carried by a countershaft 16, adapted to drive the crushing roll shaft 17 through gears 18, 19, which latter are keyed to shaft 16.

In the operation of crushers of this type non-crushable material or articles, such as tools, not infrequently find their way into the crusher. If such a material or article becomes wedged therein, there is great danger of stripping some of the teeth from the driving gearing. To avoid this it is preferred to provide a readily renewable driving element that will break before any important portion of the mechanism. For this purpose gear 18 is shown as formed integral with a sleeve 20, upon which sleeve the belt pulley 15 is loosely mounted. To cause gear 18 and therefore shaft 16 to revolve with pulley 15, pins 21, preferably of cast iron, each having a weakened portion 22, are shown. One end of each of these pins 21 is inserted in a hole in pulley 18, and the other end in a hole formed in a lug 23 formed on the hub of the pulley 15. If the crusher is stalled the weakend portion of pins 21 will break and allow the belt pulley 15 to revolve freely.

The crushing roll is preferably formed of separate castings 24, each keyed to shaft 17 and each provided with spurs 25 on its periphery. To assist the comminuting action of spurs 25, teeth 26 are shown seating in mating recesses in the opposed faces of the roll sections. The teeth 26 are preferably each formed with a flange 27 adapted to bear against the walls of the recesses to prevent backward tilting of the teeth. To further secure the teeth in the recesses they are shown as tapering from base to point, both in thickness and in width. When assembled in the roll, a packing material 27', as lead, may be run into the receses about each tooth and may be tamped when cold. To bind the roll sections together rods 28 may be passed through the spokes 29 of the roll sections, and nuts 30 may be screwed on the ends of the rods.

To coact with the crushing roll there is provided a concave 31, preferably, as shown, comprising sections 32 each provided with a stiffening rib 33. For support of the concave a bar 34 is shown, supported on standards 35. Sections 32 are subject to wear and are liable to be broken, and hence should be readily renewable. To permit of such renewal the seat for bar 34 in each section is shown as comprising a recess 36, which may be placed over the bar 34, after which a bolt 37 may be inserted through holes in the walls 38, 39, of the recess. The lower end of the sections 31 may be supported on a cross-member 40 of the frame, and for this purpose a transverse rib 41 is shown adapted to seat on the upper surface of the cross-member and providing with rib 33 a shoulder at 42, to prevent movement of the section away from the crushing roll. Spurs 43 are shown on the face of the concave to assist in the crushing action. Recesses 82 are shown in the edges of the concave sections to allow teeth 26 to revolve when the throat is spaced less than the length of the teeth.

To brace the standards 35 against push of the concave, as well as that of springs 44, to be described, braces 45 are shown passing through and bolted to the upper end of the standards, as at 46, and having eyes 47 at the lower end which are shown as placed over pins 48 passed through a frame member 10.

It is desirable to have the parts of the crusher so formed that when a stone or other piece of material gets into the crusher, which is too hard to crush, the throat of the crusher will open automatically to pass the material. To this end, in the structure shown the roll is made movable. As shown the roll shaft 17, having gears 49, 50, keyed thereon, is journaled in links 51, 52, which in turn are journaled on countershaft 16, recesses 53, 54, being provided in journals 55, 56, for the reception of the ends of the links 51, 52. Arcuate slots 57, 58, are formed in the casing 59 to permit the roll shaft to rise, and shields 60, 61, having an opening for shaft 17 may be placed thereon to close the slots 57, 58. When the roll shaft 17 rises the shields 60, 61, will rise with it.

To support the shaft 17 and links 51, 52, each link is provided with a projection, as 62, and shims 63 are shown secured to the frame for the projections to seat upon. The width of the throat may be regulated by reducing or increasing the number or thickness of these shims. Any motion of shaft 17 and links 51, 52, will be about the center of shaft 16, and will, therefore, not affect the engagement between gears 18, 19, and 49, 50.

To assist the weight of the crushing roll in resistance to lifting, springs 44 are shown, each placed over a rod 64, carrying a seat 65 for the spring. When the spring is compressed the rod 64 may play through the standard 35 to the right in Fig. 1. For connection with links 51, 52, each rod 64 is shown as provided with a fork 66, straddling a block 67 carrying pins 68, 69, passing through eyes in the fork extremities. Toggle arms 70, 71, are shown placed over the pins 68, 69, and the other ends of the arms are shown as pivoted at 72 to the end of links 51, 52.

To prevent the block 67 being moved upwardly as a resultant of the action of spring 44 and arms 70, 71, a bar 73 is shown having its lower end pivoted to pin 48 and its upper end passed through block 67 and nuts 74 placed thereon. The described mechanism forms a toggle, with arms 70, 71, and spring 44 normally pressing the shaft 17 down upon its seat. With the roll revolving in the direction of the arrow in Fig. 2, if a non-crushable object gets into the machine the roll will climb against the toggle spring pressure until the arms 70, 71, pass the horizontal, when the pressure of springs 44 will exert pressure to lift the crushing roll. However, the strength of the springs is preferably so chosen that the roll will return to place by its own weight when the emergency has passed.

To resist the push of links 51, 52, on journals 55, 56, these journals are shown as bolted down by diagonal bolts 72, 73. To reinforce the throat, inserts 74ª, corrugated on their upper surfaces, are shown bolted to the sections 31, which inserts, as well as teeth 26, are preferably formed of alloy steel.

Figure 2:
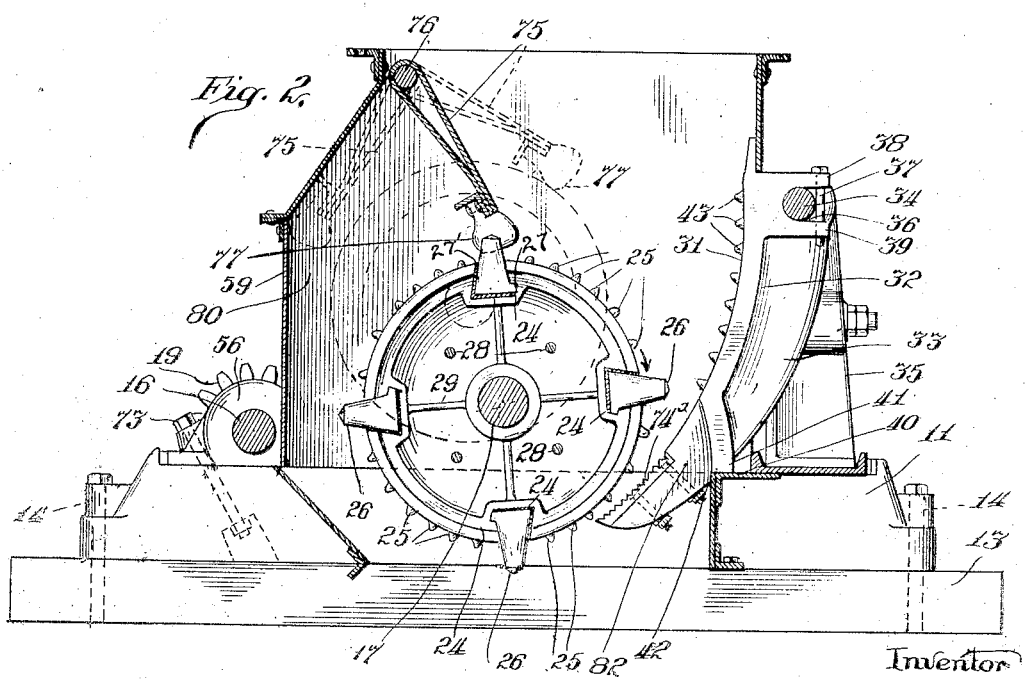
Fig. 2 is a vertical section on the line 2—2 of Fig. 3.

To direct the material to be crushed toward the throat of the crusher, a swinging plate 75 is shown as pivoted on a shaft 76, and a shoe 77 is shown projecting downwardly at each end of the plate, which shoes are adapted to come into contact with smooth areas 78, 79, at each end of the roll when the roll rises, whereby the plate will be swung upwardly out of the way of teeth 26, as shown in dotted lines in Fig. 2.

A space is provided at 80 between the roll and the casing 59. If culm or coal slack be deposited in the machine the roll may be stopped and the plate 75 may be swung to the dotted lines position 76 of Fig. 2. The culm will fill the throat and will then flow over the roll and through the space 80, which acts as a by-pass. This action may be useful if the crusher be placed under a hopper, not shown, into which the mine cars are dumped.

To permit inspection of the throat a removable plate in the casing 59 is shown at 81. A lever 83 is shown applied to the end of the shaft 76 for manipulation of the swinging plate 75, and is shown in Fig. 1 in the position it will occupy when plate 75 is moved to the dotted lines position of Fig. 2.

As the teeth 26 are preferably of pyramidal shape and pointed they operate to strike the larger lumps of coal a blow, as with a pick, to insure the initial reduction of these larger lumps. In the event of contact with non-crushable material said teeth 26 will cause the roll to lift, thus passing the obstructing material.

I claim as my invention—

1. A crusher comprising, in combination, a coöperating concave and crusher roll, the latter being carried by swinging supports, a toggle controlling the swinging of the said supports and a spring resisting the straightening of the toggle.

2. A crusher comprising, in combination, a frame, a concave, a roll journaled in upwardly swinging links, a toggle reacting between the links and the frame, and a spring interposed between the toggle and frame.

3. A crusher comprising, in combination, a concave, an upwardly movable crushing roll adapted to rise to pass non-crushable material, a spring and toggle adapted to resist upward movement of the roll until the toggle link passes a horizontal and to then assist such upward movement.

4. A crusher comprising, in combination, a frame, a countershaft journaled on said frame, driving gears on said countershaft, links pivotally mounted on said countershaft, a roll shaft journaled in said links, driven gears secured on said roll shaft in mesh with said driving gears, a crushing roll carried by said roll shaft, and a stationary concave coacting with said roll.

5. A crusher comprising, in combination, a frame, a countershaft journaled on said frame, driving gears on said countershaft, links pivotally mounted on said countershaft, a roll shaft journaled in said links, driven gears secured on said roll shaft in mesh with said driving gears, a crushing roll carried by said roll shaft, and a casing inclosing said roll having arcuate slots in the path of movement of said roll shaft about said links.

6. A crusher comprising, in combination, a frame, a countershaft journaled on said frame, driving gears on said countershaft, links pivotally mounted on said countershaft, a roll shaft journaled in said links, driven gears secured on said roll shaft in mesh with said driving gears, a crushing roll carried by said roll shaft, a casing inclosing said roll having arcuate slots in the path of movement of said roll shaft about said links, and shield plates carried by said shaft closing said slots.

7. A crusher comprising, in combination, a frame, a countershaft journaled on said frame, driving gears on said countershaft, links pivotally mounted on said countershaft, a roll shaft journaled in said links, driven gears secured on said roll shaft in mesh with said driving gears, a crushing roll carried by said roll shaft, a casing inclosing said roll having arcuate slots in the path of movement of said roll shaft about said links, toggle arms pivoted to the ends of said links and normally projecting diagonally upward therefrom, a vertical bar pivoted to said arms at its upper end and to the frame at its lower end, and a spring pressing the upper end of said vertical bar toward the links whereby downward pressure is exerted on said roll shaft when said arms are below a horizontal and upward pressure when said arms are above the horizontal.

8. In a crusher, in combination, a casing, a crushing roll mounted in said casing for upwardly yielding movement, a swinging plate adapted to deflect material to be crushed toward the throat of the crusher, and means on said plate to contact with said roll to lift the plate upon upward movement of the roll.

9. A crusher comprising, in combination, a frame, a countershaft journaled on said frame, driving pinions on said countershaft, links pivotally mounted on an axis in alinement with the axis of said countershaft, a roll shaft journaled on said links, gears secured on said roll shaft in mesh with said driving pinions, and a crushing roll carried by said roll shaft.

10. A crusher comprising, in combination, a frame, a countershaft journaled on said frame, driving pinions on said countershaft, links pivotally mounted on an axis in alinement with the axis of said countershaft, a roll shaft journaled on said links, gears secured on said roll shaft in mesh with said driving pinions, a crushing roll carried by said roll shaft, and a casing inclosing said roll and having arcuate slots in the path of movement of said roll shaft about said axis.

11. In a crusher, in combination, a frame, link means pivoted on the frame, a coöperating horizontal crusher roll having breaker teeth and a normally stationary upright concave, the said concave being carried by the frame and the said crusher roll being journaled on the said link means, driving means journaled in the frame adjacent the pivot of the said link means and means communicating motion from the said driving means to the crusher roll to turn the crusher roll downwardly at the side adjacent to concave whereby contact of the breaker teeth of the crusher roll with non-crushable material will lift the crusher roll and link means without interfering with the driving of the crusher roll.

MYRON A. KENDALL.